(12) United States Patent
Kerkhoff (10) Patent No.: US 7,301,090 B2
(45) Date of Patent: *Nov. 27, 2007

(54) PIANO KEY FINDER AND CHORD INDICATOR

(76) Inventor: Dean Kerkhoff, 3418 Cosbey Ave., Baldwin Park, CA (US) 91706

( * ) Notice: Subject to any disclaimer, the term of this patent is extended or adjusted under 35 U.S.C. 154(b) by 0 days.

This patent is subject to a terminal disclaimer.

(21) Appl. No.: 11/192,800

(22) Filed: Jul. 29, 2005

(65) Prior Publication Data
US 2005/0257665 A1 Nov. 24, 2005

Related U.S. Application Data

(62) Division of application No. 10/620,528, filed on Jul. 15, 2003, now Pat. No. 6,969,793.

(51) Int. Cl.
G09B 15/00 (2006.01)
(52) U.S. Cl. .................................. 84/485 SR
(58) Field of Classification Search .............. 84/478, 84/477 R, 470 R, 471 R, 472, 473, 475, 84/471 SR, 480
See application file for complete search history.

(56) References Cited

U.S. PATENT DOCUMENTS

| | | | |
|---|---|---|---|
| 675,345 A | 5/1901 | Bauer | |
| 3,668,967 A | 6/1972 | Malis | |
| 3,728,931 A | 4/1973 | Leonard | |
| 4,960,029 A | 10/1990 | Nelson | |
| 5,029,507 A * | 7/1991 | Bezeau, Jr. | 84/485 SR |
| 5,386,757 A | 2/1995 | Derrick | |
| 5,524,522 A * | 6/1996 | Hesnan | 84/473 |
| 5,644,096 A * | 7/1997 | Bull | 84/485 SR |
| 5,731,572 A | 3/1998 | Winn | |
| 6,031,172 A | 2/2000 | Papadopoulos | |
| 6,323,410 B1 * | 11/2001 | Rackow | 84/470 R |

* cited by examiner

*Primary Examiner*—Kimberly Lockett
(74) *Attorney, Agent, or Firm*—David A. Belasco; Belasco Jacobs & Townsley, LLP (57) ABSTRACT

An instructional device for use by music students is constructed as an outer sleeve having a slide member fitted within it. The outer sleeve has first and second sets of openings through and is imprinted with a representation of a piano keyboard on one surface. The slide member has alphabetic representations of musical notes arranged to show through the first set of openings as the slide member is moved through the sleeve. One alphabetic representation shows the musical key selected and seven others display the notes of the major scale and major and minor chords associated with that key. A first series of markings sized and located to show through the second set of openings and will indicate the piano keys related to the major scale selected. Additional sets of openings and markings on the slide member indicate the piano keys associated with the major and minor chords selected. These piano keys may also be shown by colored markings or differently shaped openings.

21 Claims, 10 Drawing Sheets

PIANO KEY FINDER AND CHORD INDICATOR

CROSS REFERENCE TO RELATED APPLICATIONS

This application is a divisional of application Ser. No. 10/620,528, filed Jul. 15, 2003, now U.S. Pat. No. 6,969,793.

FIELD OF INVENTION

The invention pertains to teaching and learning aids for musical instruments. More particularly, the invention relates to a device for helping piano students to determine which notes and piano keyboard locations are associated with the major scale for each key and which major and minor chords are associated with that key.

BACKGROUND OF THE INVENTION

Musical intervals depend on whether one is playing a major or minor key but are independent of the exact key that is being played. The intervals between notes vary by a half step depending on what note one starts on and whether one is playing in a major or minor key. Various hand-held devices have been developed for assisting music teachers and students to determine the notes and chord combinations associated with each key. These inventions involve different types of wheels, rotating cylinders, vertical and horizontal slides and similar devices. Some of these inventions illustrate fingering combinations for use with a guitar.

U.S. Pat. No. 3,728,931 issued to Leonard discloses an intervalometer. That is it calculates the notes which are at set intervals from any root note. The Leonard invention does not have a means for displaying alphabetic representation of a major scale associated with a selected musical key. Reference numbers 28 and 30 are representations of a chromatic scale with their associated alphabetic representations. They are not associated in any way with a key. Moreover, Leonard does not have a means for indicating piano keys associated with the major scale associated with a selected key. Reference numbers 36 and 38 are simply a row of boxes with alphabetical annotations of all the natural notes. Although there are boxes for them, no sharp or flat notes are noted in any of the boxes. On a piano keyboard the white keys are the natural notes and the sharp and flat keys are black and set back from the white keys. There are no spaces between the natural keys for the sharp and flat keys. Finally, in the Leonard invention, the holder 10 is a sheet folded essentially in half. Consequently, it is only joined along one edge 16. Also, there are no openings in Leonard's holder 10, Leonard's slide 12, 14 juts sideways out of the holder 10, and the markings 46, 42 on the slide 12, 14 are outside of the area covered by the holder 10.

U.S. Pat. No. 4,960,029 issued to Nelson is directed to a musical scale-determining device. The device has a thin sheet material body constructed of either paper or plastic or some other rigid material. Printed on the front surface are a number of longitudinally oriented rows of musical notes. Two of the rows are located within an upper section and two of the rows are located in a lower section. Located on the front surface are a series of indicators comprising a pointer that point either to the upper section or the lower section, or both. Located on the back surface of the body are vertical rows of musical notes, again located in an upper section and a lower section. Formed within the back surface of a cursor are a series of transparent windows for observing a single column of three notes within either an upper section or a lower section. This cursor is slidable and is used to determine the major and minor chords for different keys. Within the front surface of the cursor are also located a plurality of windows with identifying indicia as Roman Numerals I-VIII to denote major sharp and flat scales. The cursor is also formed of thin sheet material and forms an internal chamber into which the necked down section of the body is disposed.

U.S. Pat. No. 3,668,967 issued to Malis, is directed to a chord indicator in the form of a slide rule device. The device is comprised of a first elongated slide, a second elongated slide carried within the first slide, and an outer elongated indicator which is adapted to slidably receive and contain the first and second slides. The first slide is an elongated sleeve, which surrounds the second slide, and indicator is also an elongated sleeve, which surrounds the second slide. The first slide has a series of indexing windows extending completely through the front face at a location near the right end thereof to show corresponding chord type identification. The front face of the first slide also includes a plurality of apertures along its length, which are substantially equal in size to and are adapted to uncover spots on the second slide. The first slide also has imprinted along the lower edge of its front surface a series of characters, which represent the various notes in the scale. Manipulation of the slides permit identification of the chord name, title or selection of a particular chord, identification of the notes in that chord, the chord type, and other useful musical information.

U.S. Pat. No. 6,031,172, issued to Papadopoulos is directed to music teaching aid. The teaching aid comprises a cylindrical body, the periphery of which is substantially covered by a plurality of reference rings that have independent rotary movement. As seen, each ring is divided into twelve segments, each of which has an identification that represents the successive notes of the major scale. It is seen that appropriate manipulation of these rings with accompanying teaching aids permits one to identify all possible types of scales, major, minor and chord constructions.

U.S. Pat. No. 675,345 issued to Bauer is directed to a music chart circa 1901. It is seen that there is a music chart with a face-plate and a back plate which is ruled longitudinally to form a series of subdivisions or rows to indicate the principal major chords and corresponding minor chords which are identifying through the use of a slider which can be appropriately slidingly displaced to identify major keys, minor key, dominant chords and tonic triads.

U.S. Pat. No. 5,386,757 issued to Derrick is directed to a universal musical scale, scale pattern, and chord indicator. Device housing is of a slide-rule nature and is generally a hollow envelope-shaped enclosure open at either end and designed to function interdependently with any pre-selected sliding member. A number of sliding members are provided with indicia indicative of the degrees of a musical scale respectively printed adjacent to each display window formed in housing. As seen, the combination of the primary housing with a particular sliding member provides information to identify certain characteristics within musical scales and assist in the identification of chords, tone indicators and other musical qualities.

While other variations exist, the above-described designs for note and chord identifying devices are typical of those encountered in the prior art. It is an objective of the present invention to provide a simple, portable device for use by piano students and teachers to determine the notes of the major scale for each key. It is a further objective to provide a device that indicates the piano keyboard locations for each such note. It is a still further objective of the invention to identify the major and minor chords associated with each key. It is yet a further objective to indicate the keyboard locations of each of the major and minor chords. Finally, it is an objective of the invention to provide the above-described capabilities in an inexpensive and durable device that may be easily and inexpensively manufactured.

While some of the objectives of the present invention are disclosed in the prior art, none of the inventions found include all of the requirements identified.

SUMMARY OF THE INVENTION

The present invention addresses all of the deficiencies of prior piano key finder and chord indicator inventions and satisfies all of the objectives described above.

(1) A piano key finder and chord indicator providing the desired features may be constructed from the following components. Means are provided for displaying alphabetic representations of a major scale associated with a selected musical key. Means are provided for displaying alphabetic representations of major and minor chords associated with the selected musical key. Means are provided for indicating piano keys associated with the major scale associated with the selected musical key.

(2) In a variant of the invention, an outer sleeve is provided. The outer sleeve is formed of semi-rigid material and has a front surface, a back surface, top and bottom edges, first and second ends and an interior cavity. The interior cavity is open at the first and second ends of the outer sleeve. The outer sleeve has a representation of a portion of a piano keyboard and first and second series of openings penetrating at least one of the front and rear surfaces. A slide member is provided. The slide member has first and second ends and is sized and shaped to fit slidably within the interior cavity. The slide member has a first portion and a second portion. The first portion carries alphabetic representations. The representations are sized and shaped to be visible through the first set of openings in the outer sleeve as the slide member is moved through the outer sleeve.

The alphabetic representations illustrate a selected musical key, a major scale, a major chord and a minor chord associated with the musical key. The second portion has a first series of markings. The first markings are sized and shaped to be visible through the second set of openings in the outer sleeve as the slide member is moved through the outer sleeve. The first markings indicate piano keys associated with the major scale associated with the selected musical key. When a user moves the slide member within the inner cavity of the outer sleeve, aligning one of the first series of openings in the outer sleeve with one of the alphabetic representations illustrating a selected musical key, the alphabetic representations for each note of the major scale as well as major and minor chords associated with that selected musical key will be visible through the first set of openings and the first markings indicating the piano keys associated with the major scale will be visible through the second set of openings.

(3) In another variant, the piano key finder and chord indicator further includes means for preventing the slide member from being removed from the outer sleeve.

(4) In yet another variant, the means for preventing the slide member from is removed from the outer sleeve further includes first and second enlarged end sections. The enlarged end sections are attached at the first and second ends of the slide member. The enlarged end sections are sized and shaped to prevent their passage through the interior cavity. When the slide member is moved through the interior cavity to permit alignment of the alphabetic representations with the first the series of openings, the slide member will remain permanently and slidably attached to the outer sleeve.

(5) In still another variant, at least one finger notch is provided. The finger notch is located at either of the first and second ends of the outer sleeve. When the first end of the slide member is aligned with the first end of the inner sleeve, the finger notch will permit the slide member to be either of pulled from and pushed into the outer sleeve.

(6) In a further variant of the invention, the second set of openings in the outer sleeve are of a first predetermined shape.

(7) In still a further variant, a third set of openings in the outer sleeve is provided. The third set of is of a second predetermined shape and located on the representation of a portion of a piano keyboard. A second series of markings is provided. The second series of markings is located on the second portion of the slide member and positioned so as to indicate the piano keys associated with a major chord for a selected key when the sleeve member is aligned with the outer sleeve so that the alphabetic representation associated with the selected key is visible through one of the first set of openings.

(8) In another variant, a fourth set of openings in the outer sleeve is provided. The fourth set of openings is of a third predetermined shape and located on the representation of a portion of a piano keyboard. A third series of markings is provided. The third series of markings is located upon the second portion of the slide member and positioned so as to indicate the piano keys associated with a minor chord for a selected key when the slide member is aligned with the outer sleeve so that the alphabetic representation associated with the selected key is visible through one of the first set of openings.

(9) In yet another variant, a third and a fourth set of openings in the outer sleeve are provided. The third set of openings is of a second predetermined shape, the fourth set of openings is of a third predetermined shape. The third and fourth set of openings are located upon the representation of a portion of a piano keyboard. Second and third series of marking are provided. The second and third series of markings are located on the second portion of the slide member and positioned so as to indicate the piano keys associated with a major chord and a minor chord for a selected key when the slide member is aligned with the outer sleeve so that the alphabetic representation associated with the selected key is visible through one of the first set of openings.

(10) In still another variant, the first series of markings are of a first predetermined color.

(11) In still a further variant, a fifth set of openings in the outer sleeve is provided. The fifth set of openings is located on the representation of a portion of a piano keyboard. A fourth series of markings is provided. The fourth series of markings is of a second predetermined color and is located upon the second portion of the slide member and positioned so as to indicate the piano keys associated with a major chord for a selected key when the slide member is aligned with the outer sleeve so that the alphabetic representation associated with the selected key is visible through one of the first set of openings.

(12) In yet a further variant of the invention, a sixth set of openings in the outer sleeve is provided. The sixth set of openings is located on the representation of a portion of a piano keyboard. A fifth series of markings is provided. The fifth series of markings is of a third predetermined color and located upon the second portion of the slide member and positioned so as to indicate the piano keys associated with a minor chord for a selected key when the slide member is aligned with the outer sleeve so that the alphabetic representation associated with the selected key is visible through one of the first set of openings.

(13) In still a further variant, a fifth and a sixth set of openings in the outer sleeve are provided. The fifth and sixth sets of openings are located on the representation of a portion of a piano keyboard. A fourth and a fifth series of markings are provided. The fourth and fifth series of markings are of second and third predetermined colors and located on the second portion of the slide member. The fourth and fifth sets of markings are positioned so as to indicate the piano keys associated with a major chord and a minor chord for a selected key when the slide member is aligned with the outer sleeve so that the alphabetic representation associated with the selected key is visible through one of the first set of openings.

(14) In a further variant of the invention, a method of displaying an alphabetic representation of a major scale, major and minor chords and identifying piano keys associated with a selected musical key is providing, which includes steps of: Providing an outer sleeve. The outer sleeve is formed of semi-rigid material and has a front surface, a back surface, top and bottom edges, first and second ends and an interior cavity. The interior cavity is open at the first and second ends of the outer sleeve. The outer sleeve has a representation of a portion of a piano keyboard and first and second series of openings penetrating at least one of the front and rear surfaces.

Providing a slide member. The slide member has first and second ends and is sized and shaped to fit slidably within the interior cavity. The slide member has a first portion and a second portion. Marking the first portion with alphabetic representations. The representations are sized and shaped to be visible through the first set of openings in the outer sleeve as the slide member is moved through the outer sleeve. The alphabetic representations illustrate a selected musical key, a major scale, a major chord and a minor chord associated with the musical key. Providing the second portion with a first series of markings. The first markings is sized and shaped to be visible through the second set of openings in the outer sleeve as the slide member is moved through the outer sleeve. The first markings indicate piano keys associated with the major scale associated with the selected musical key.

Moving the slide member within the inner cavity of the outer sleeve to align one of the first series of openings in the outer sleeve with one of the alphabetic representations illustrating a selected musical key. Displaying the alphabetic representations for each note of the major scale as well as major and minor chords associated with that selected musical key through the first series of openings. Displaying the first markings indicating the piano keys associated with the major scale will be visible through the second set of openings.

(15) In still a further variant, the method of displaying an alphabetic representation of a major scale, major and minor chords and identifying piano keys associated with a selected musical key further includes the step of providing the second set of openings in the outer sleeve in a first predetermined shape.

(16) In yet a further variant, the method includes the additional steps of: Providing a third set of openings in the outer sleeve. The third set of openings is of a second predetermined shape and located on the representation of a portion of a piano keyboard. Providing a second set of markings. The second set of markings is located on the second portion of the slide member and positioned so as to indicate the piano keys associated with a major chord for a selected key. Aligning the sleeve member with the outer sleeve so that the alphabetic representation associated with the selected key is visible through one of the first set of openings. Displaying the piano keys associated with the major chord associated with the selected musical key.

(17) In another variant the method includes the additional steps of: Providing a fourth set of openings in the outer sleeve. The fourth set of openings is of a third predetermined shape and located on the representation of a portion of a piano keyboard. Providing a third set of markings. The third set of markings is located on the second portion of the slide member and positioned so as to indicate the piano keys associated with a minor chord for a selected key. Aligning the sleeve member with the outer sleeve so that the alphabetic representation associated with the selected key is visible through one of the first set of openings. Displaying the piano keys associated with the minor chord associated with the selected musical key.

(18) In still another variant, the method includes the additional steps of: Providing a third set and a fourth set of openings in the outer sleeve. The third and fourth sets of openings are of second and third predetermined shapes and located on the representation of a portion of a piano keyboard. Providing a second set and a third set of markings. The second and third sets of markings are located on the second portion of the slide member and positioned so as to indicate the piano keys associated with a minor chord for a selected key. Aligning the sleeve member with the outer sleeve so that the alphabetic representation associated with the selected key is visible through one of the first set of openings. Displaying the piano keys associated with the minor chord associated with the selected musical key.

(19) In yet another variant, the method includes the additional step of providing the first set of markings in a first predetermined color.

(20) In a further variant, the method includes the additional steps of: Providing a third set of openings in the outer sleeve. The third set of openings is located on the representation of a portion of a piano keyboard. Providing a second set of markings. The second set of markings is of a second predetermined color and is located on the second portion of the slide member and positioned so as to indicate the piano keys associated with a major chord for a selected key. Aligning the sleeve member with the outer sleeve so that the alphabetic representation associated with the selected key is visible through one of the first set of openings. Displaying the piano keys associated with the major chord associated with the selected musical key.

(21) In still a further variant, the method includes the additional steps of: Providing a fourth set of openings in the outer sleeve. The fourth set of openings is located on the representation of a portion of a piano keyboard. Providing a third set of markings, The third set of markings is of a third predetermined color and located on the second portion of the slide member and positioned so as to indicate the piano keys associated with a minor chord for a selected key. Aligning the sleeve member with the outer sleeve so that the alphabetic representation associated with the selected key is visible through one of the first set of openings. Displaying the piano keys associated with the minor chord associated with the selected musical key.

(22) In a final variant, the method includes the additional steps of: Providing a third and a fourth set of openings in the outer sleeve. The third and fourth sets of openings are located upon the representation of a portion of a piano keyboard. Providing a second and a third set of markings. The second and third sets of markings are of second and third predetermined colors and located on the second portion of the slide member. The second and third sets of markings are positioned so as to indicate the piano keys associated with a major chord and a minor chord for a selected key. Aligning the sleeve member with the outer sleeve so that the alphabetic representation associated with the selected key is visible through one of the first set of openings. Displaying the piano keys associated with the major and minor chord associated with the selected musical key.

An appreciation of the other aims and objectives of the present invention and an understanding of it may be achieved by referring to the accompanying drawings and the detailed description of a preferred embodiment.

Figure 1:
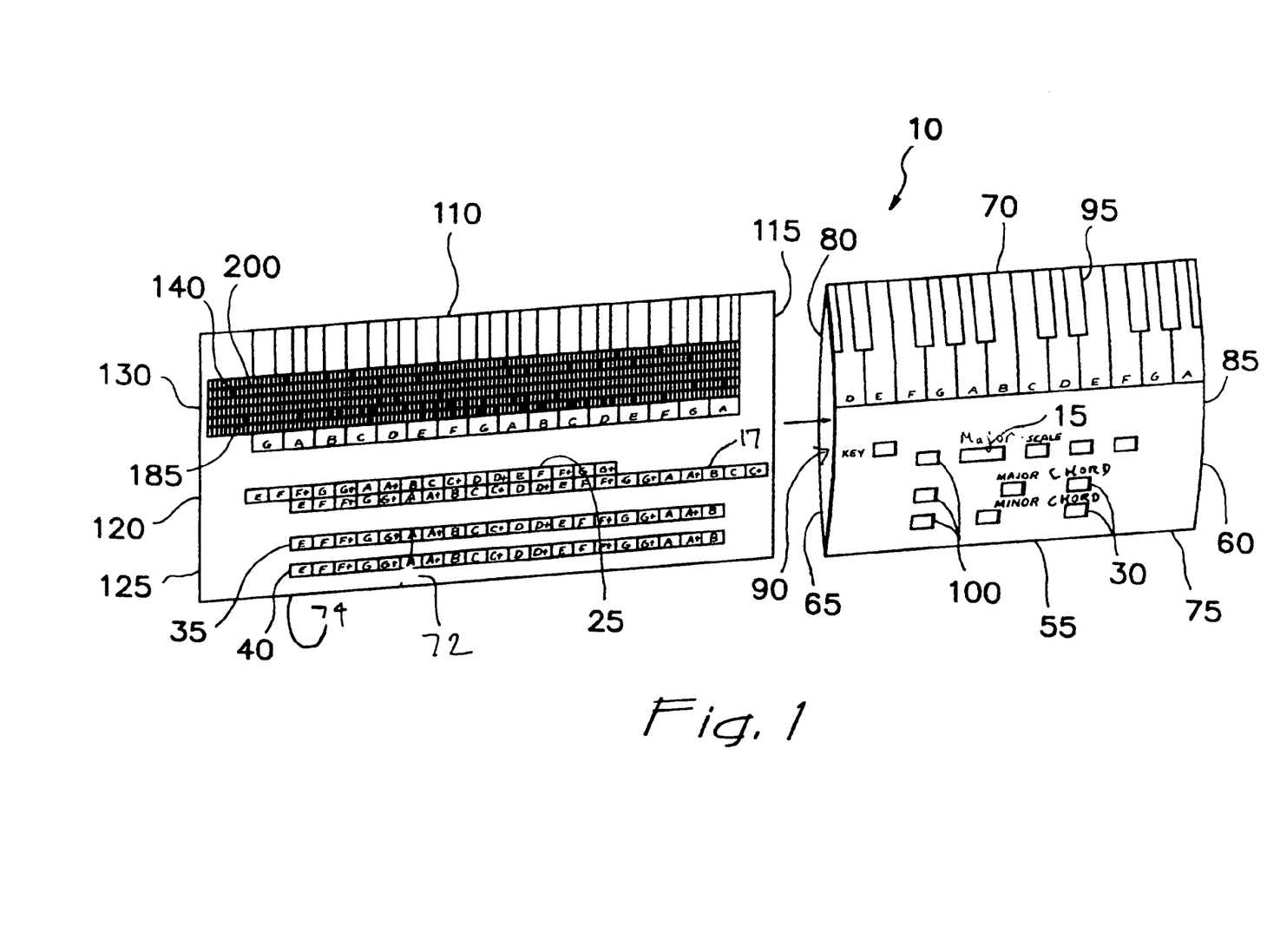
FIG. 1 is a perspective view of the preferred embodiment of the invention illustrating how the two main components interact.
Figure 2:
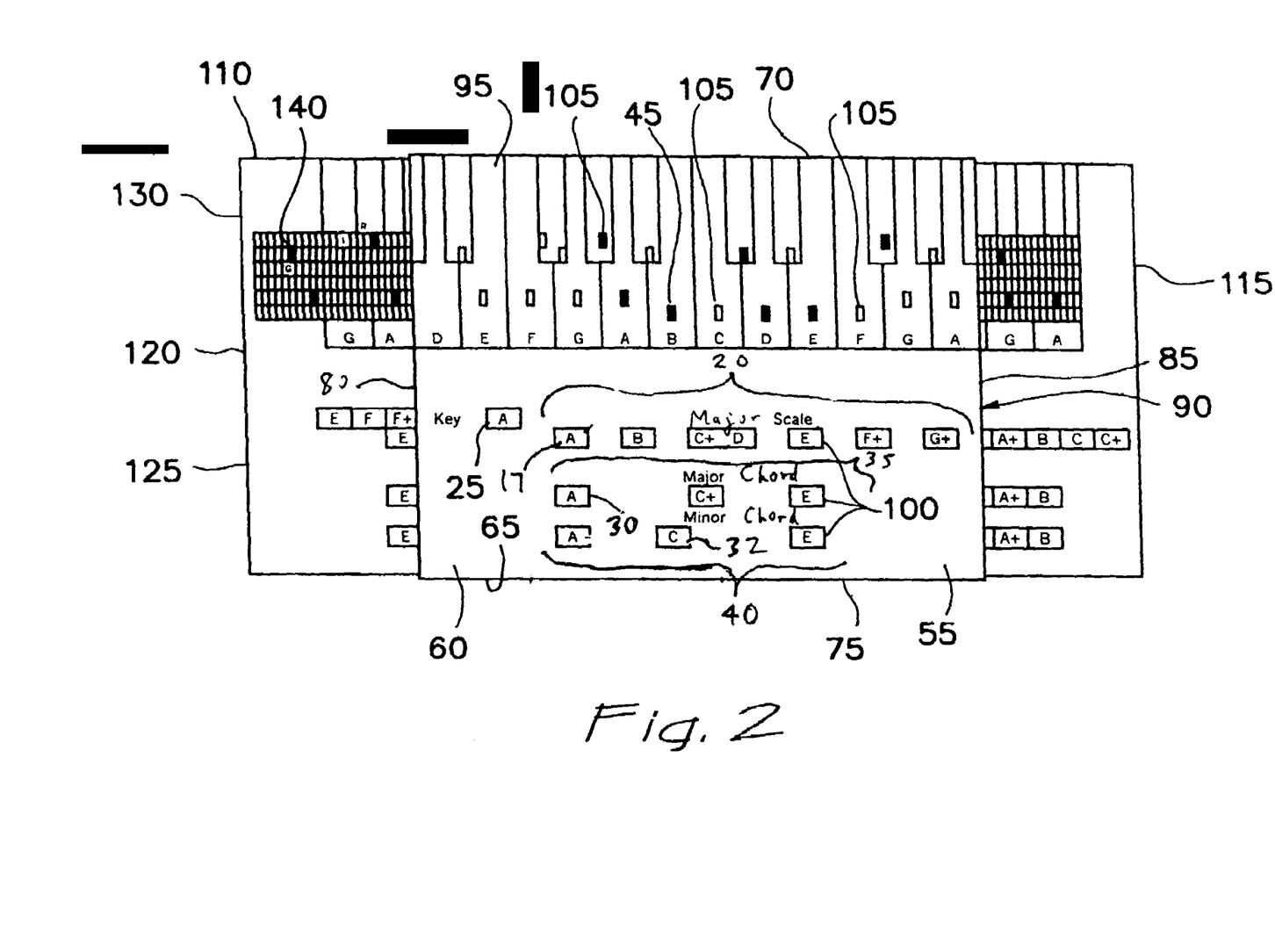
FIG. 2 is a plan view of the preferred embodiment of the invention illustrating the operation of the invention.

DETAILED DESCRIPTION OF THE PREFERRED EMBODIMENT (1) FIGS. 1-5 illustrate a piano key finder and chord indicator 10 providing the desired features that may be constructed from the following components. As illustrated in FIGS. 1 and 2, means 15 are provided for displaying alphabetic representations 17 of a major scale 20 associated with a selected musical key 25. Means 30 are provided for displaying alphabetic representations 17 of major 35 and minor 40 chords associated with the selected musical key 25. Means 45 are provided for indicating piano keys associated with the major scale 20 associated with the selected musical key 25.

(2) In a variant of the invention, an outer sleeve 55 is provided. The outer sleeve 55 is formed of semi-rigid material and has a front surface 60, a back surface 65, top 70 and bottom 75 edges, first 80 and second 85 ends and an interior cavity 90. The interior cavity 90 is open at the first 80 and second 85 ends of the outer sleeve 55. The outer sleeve 55 has a representation of a portion of a piano keyboard 95 and first 100 and second 105 sets of openings penetrating one surface 60, 65. A slide member 110 is provided. The slide member 110 has first 115 and second 120 ends, a front surface 72 and a back surface 74 and is sized and shaped to fit slidably within the interior cavity 90. One surface 72, 74 of the slide member 110 has a first portion 125 and a second portion 130. The first portion 125 carries alphabetic representations 17. The representations 17 are sized and shaped to be visible through the first set of openings 100 in the outer sleeve 55 as the slide member 110 is moved through the outer sleeve 55.

The alphabetic representations 17 illustrate a selected musical key 25, a major scale 20, a major chord 35 and a minor chord 40 associated with the musical key 25. The second portion 130 has a first series of markings 140. The first markings 140 are sized and shaped to be visible through the second set of openings 105 in the outer sleeve 55 as the slide member 110 is moved through the outer sleeve 55. The first markings 140 indicate piano keys associated with the major scale 20 associated with the selected musical key 25. When a user moves the slide member 110 within the interior cavity 90 of the outer sleeve 55, aligning one of the first set of openings 100 in the outer sleeve 55 with one of the alphabetic representations 17 illustrating a selected musical key 25, the alphabetic representations 17 for each note of the major scale 20 as well as major 35 and minor 40 chords associated with that selected musical key 25 will be visible through the first set of openings 100 and the first markings 140 indicating the piano keys associated with the major scale 20 will be visible through the second set of openings 105.

Figure 3:
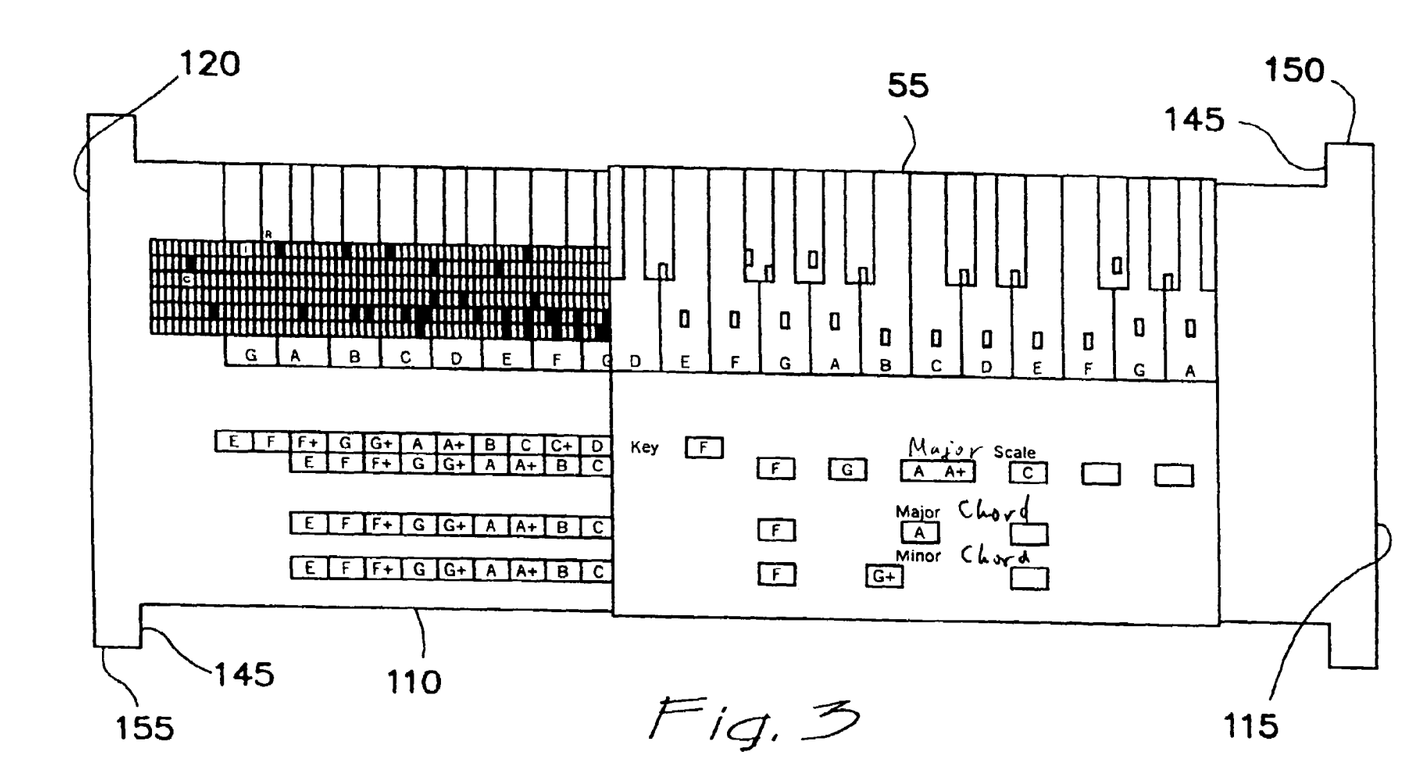
FIG. 3 is a plan view of an embodiment that includes a means for preventing the slide member from being removed from the outer sleeve.
Figure 4:
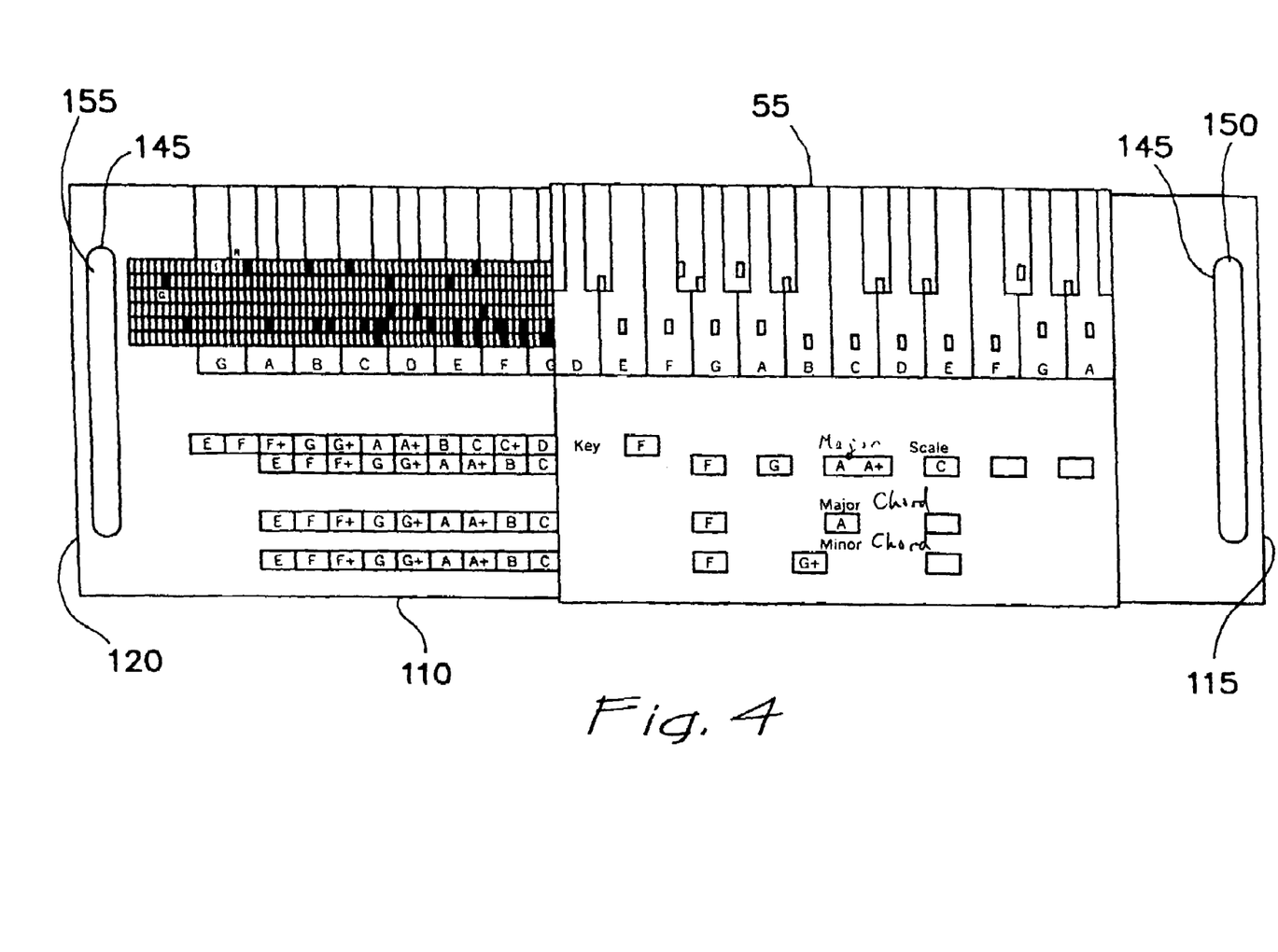
FIG. 4 is a plan view of another embodiment that includes a means for preventing the slide member from being removed from the outer sleeve.

(3) In another variant, as illustrated in FIGS. 3 and 4, the piano key finder and chord indicator 10 further includes means 145 for preventing the slide member 110 from being removed from the outer sleeve 55.

(4) In yet another variant, as illustrated in FIGS. 3 and 4, the means 145 for preventing the slide member 110 from being removed from the outer sleeve 55 further includes first 150 and second 155 enlarged end sections. The enlarged end sections 150, 155 are attached at the first 115 and second 120 ends of the slide member 110. The enlarged end sections 150, 155 are sized and shaped to prevent their passage through the interior cavity 90. When the slide member 110 is moved through the interior cavity 90 to permit alignment of the alphabetic representations 17 with the first the series of openings 100, the slide member 110 will remain permanently and slidably attached to the outer sleeve 55.

Figure 5:
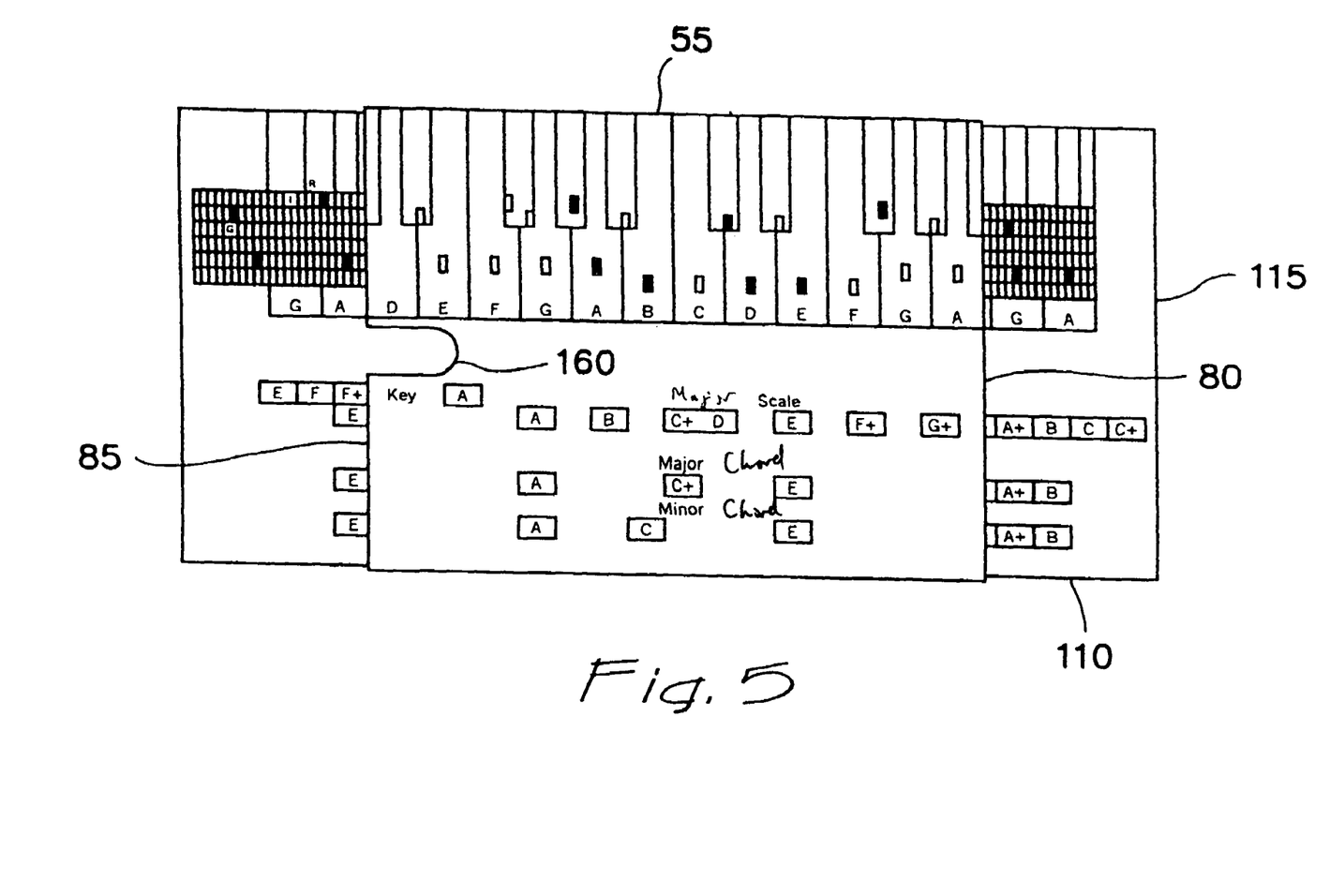
FIG. 5 is a plan view of an embodiment that includes a means for allowing a user to pull or push the slide member when it is aligned with the edge of the outer sleeve.

(5) In still another variant, as illustrated in FIG. 5, at least one finger notch 160 is provided. The finger notch 160 is located at either of the first 80 and second 85 ends of the outer sleeve 55. When the first end 115 of the slide member 110 is aligned with the first end of the outer sleeve 55, the finger notch 160 will permit the slide member 110 to be either pulled from or pushed into the outer sleeve 55.

Figure 6:
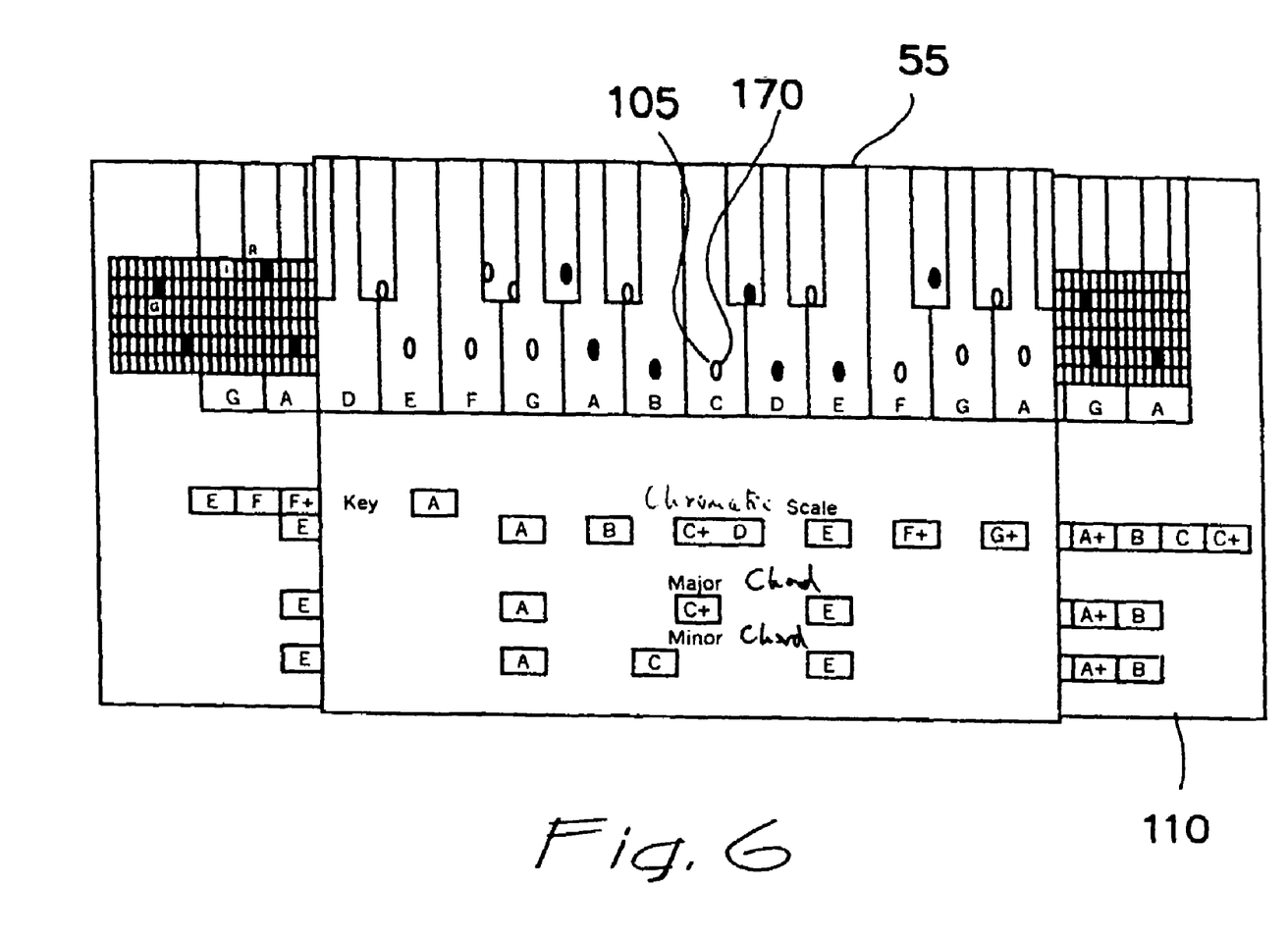
FIG. 6 is a plan view of an embodiment where the second set of openings are of a predetermined shape.

(6) In a further variant of the invention, as illustrated in FIG. 6, the second set of openings 105 in the outer sleeve 55 are of a first predetermined shape 170.

Figure 7:
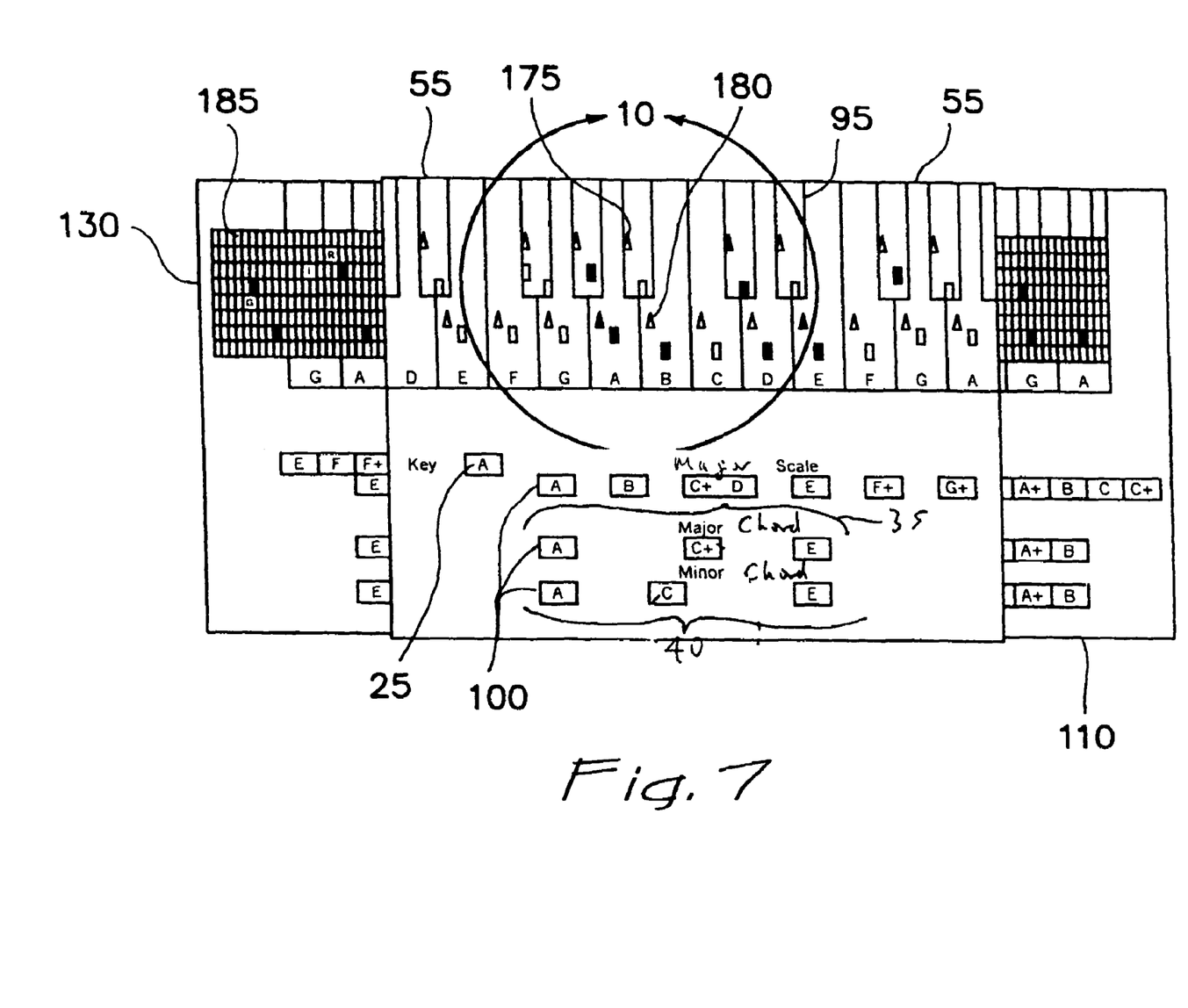
FIG. 7 is a plan view of an embodiment of the invention that includes a third set of opening and a second series of markings.

(7) In still a further variant, as illustrated in FIG. 7, a third set of openings 175 in the outer sleeve 55 is provided. The third set of openings 175 is of a second predetermined shape 180 and located on the representation of a portion of a piano keyboard 95. A second series of markings 185 is provided. The second series of markings 185 is located on the second portion 130 of the slide member 110 and positioned so as to indicate the piano keys associated with a major chord 35 for a selected key 25 when the slide member 110 is aligned with the outer sleeve 55 so that the alphabetic representation 17 associated with the selected key 25 is visible through one of the first set of openings 100.

Figure 8:
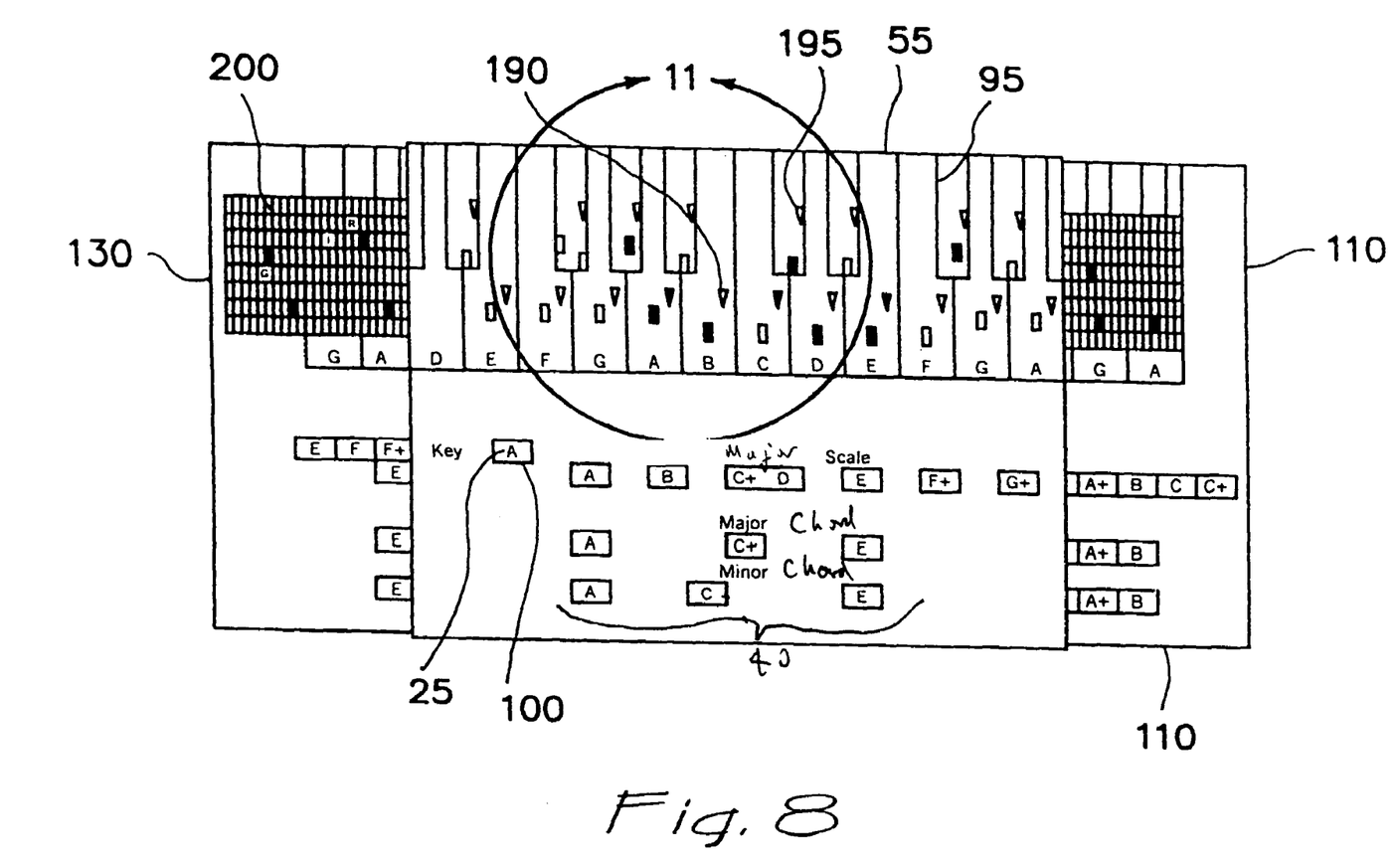
FIG. 8 is a plan view of an embodiment of the invention that includes a fourth set of openings and a third series of markings.

(8) In another variant, as illustrated in FIG. 8, a fourth set of openings 190 in the outer sleeve 55 is provided. The fourth set of openings 190 is of a third predetermined shape 195 and located on the representation of a portion of a piano keyboard 95. A third series of markings 200 is provided. The third set series of markings 200 is located upon the second portion 130 of the slide member 110 and positioned so as to indicate the piano keys associated with a minor chord 40 for a selected key 25 when the slide member 110 is aligned with the outer sleeve 55 so that the alphabetic representation 17 associated with the selected key 25 is visible through one of the first set of openings 100.

Figure 9:
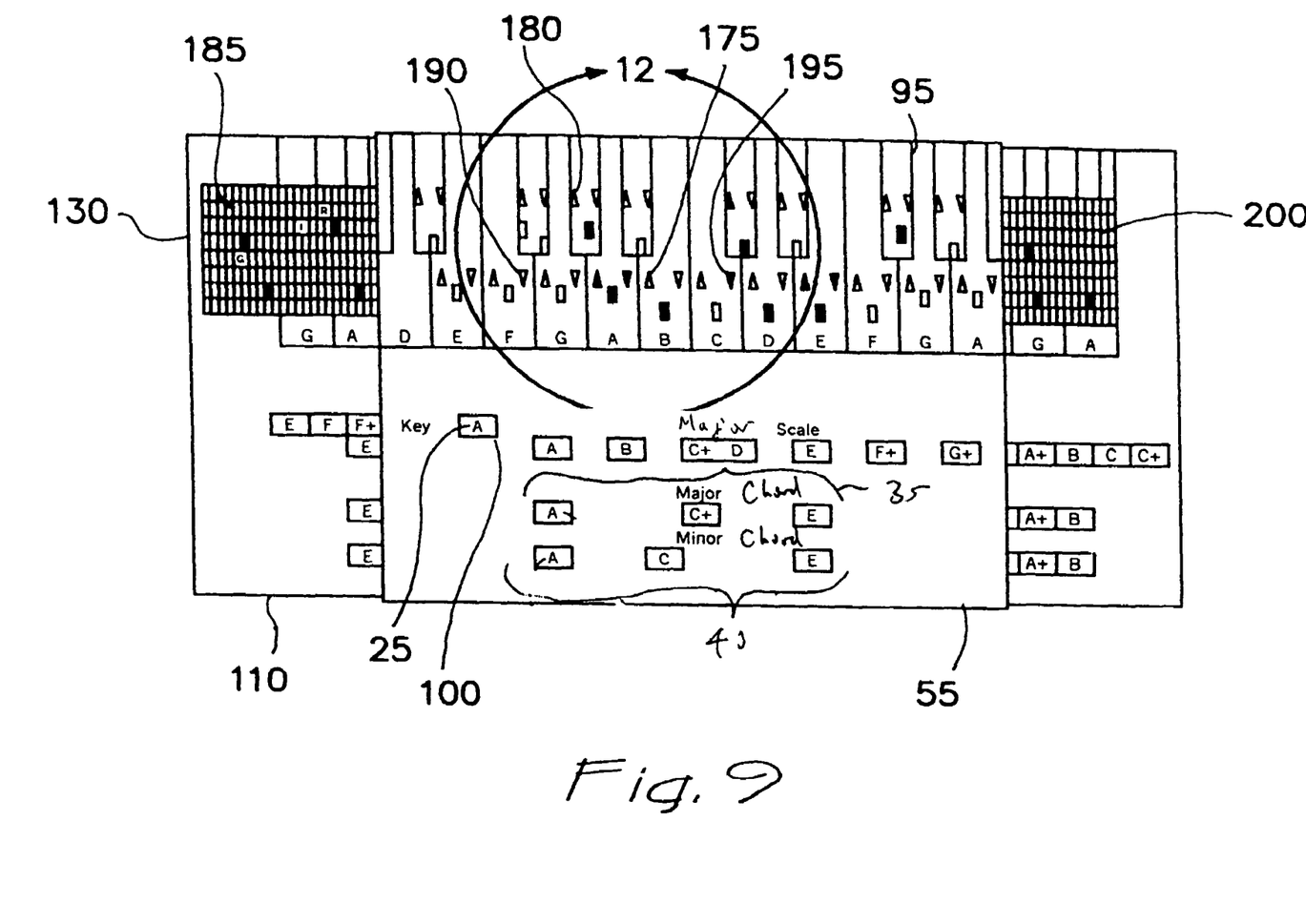
FIG. 9 is a plan view of an embodiment of the invention that includes both a third and fourth sets of openings and a second and third series of markings.

(9) In yet another variant, as illustrated in FIG. 9, a third 175 and a fourth 190 set of openings in the outer sleeve 55 are provided. The third set of openings 175 is of a second predetermined shape 180, the fourth set of openings 190 is of a third predetermined shape 195. The third 175 and fourth 190 set of openings are located upon the representation of a portion of a piano keyboard 95. Second 185 and third 200 series of markings are provided. The second 185 and third 200 sets of markings are located on the second portion 130 of the slide member 110 and positioned so as to indicate the piano keys associated with a major chord 35 and a minor chord 40 for a selected key 25 when the slide member 110 is aligned with the outer sleeve 55 so that the alphabetic representation 17 associated with the selected key 25 is visible through one of the first set of openings 100.

Figure 10:
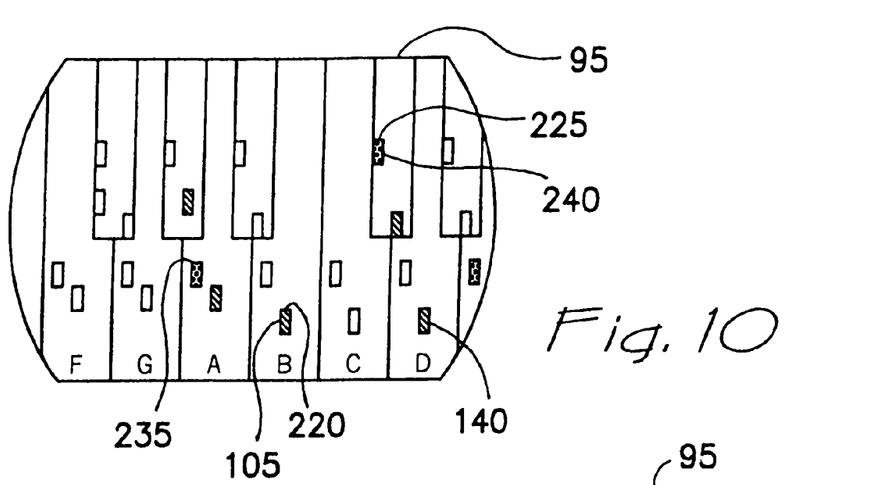
FIG. 10 is a plan view of an embodiment of the invention that includes a fifth set of openings and several series of markings that are of predetermined colors.

(10) In still another variant, as illustrated in FIG. 10, the first series of markings 140 are of a first predetermined color 220.

(11) In still a further variant, as illustrated in FIG. 10, a fifth set of openings 235 in the outer sleeve 55 is provided. The fifth set of openings 235 is located on the representation of a portion of a piano keyboard 95. A fourth series of markings 240 is provided. The fourth series of markings 240 are of a second predetermined color 225 and is located upon the second portion 130 of the slide member 110 and positioned so as to indicate the piano keys associated with a major chord 35 for a selected key 25 when the slide member 110 is aligned with the outer sleeve 55 so that the alphabetic representation 17 associated with the selected key 25 is visible through one of the first set of openings 100.

Figures 11, 12:
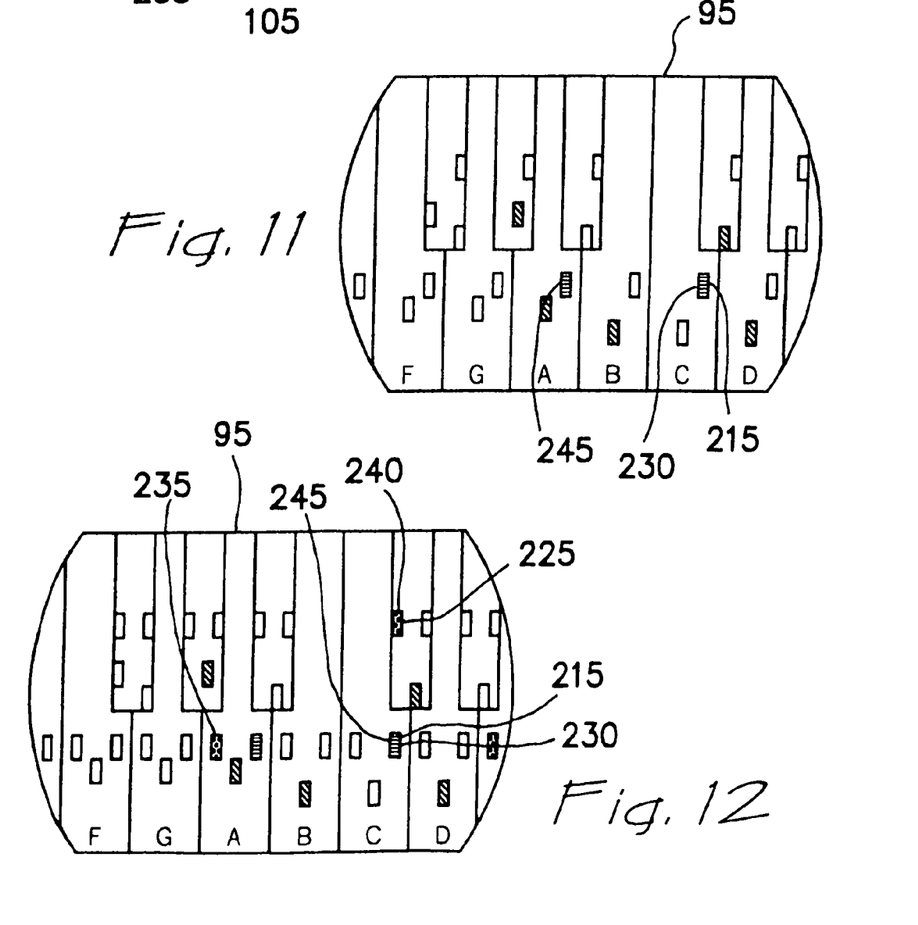
FIG. 11 is a plan view of an embodiment of the invention that includes a sixth set of openings and several series of markings that are of predetermined colors.
FIG. 12 is a plan view of an embodiment of the invention that includes both a fifth and sixth sets of openings and several series of markings that are of predetermined colors.

(12) In yet a further variant of the invention, as illustrated in FIG. 11, a sixth set of openings 245 in the outer sleeve is provided. The sixth set of openings 245 is located on the representation of a portion of a piano keyboard 95. A fifth series of markings 215 are provided. The fifth series of markings 215 are of a third predetermined color 230. The markings are located upon the second portion 130 of the slide member 110 and positioned so as to indicate the piano keys associated with a minor chord 40 for a selected key 25 when the slide member 110 is aligned with the outer sleeve 55 so that the alphabetic representation 17 associated with the selected key 25 is visible through one of the first set of openings 100.

(13) In still a further variant, as illustrated in FIG. 12, fifth 235 and a sixth 245 set of openings in the outer sleeve 55 are provided. The fifth 235 and a sixth 245 sets of openings are located on the representation of a portion of a piano keyboard 95. A fourth 240 and a fifth 215 series of markings 200 are provided. The fourth 240 and a fifth 215 series of markings are of second 225 and third 230 predetermined colors and located on the second portion 130 of the slide member 110. The fourth 240 and a fifth 215 series of markings are positioned so as to indicate the piano keys associated with a major chord 35 and a minor chord 40 for a selected key 25 when the slide member 110 is aligned with the outer sleeve 55 so that the alphabetic representation 17 associated with the selected key 25 is visible through one of the first set of openings 100.

The invention claimed is:
1. A piano key finder and chord indicator, comprising:
an outer sleeve, said outer sleeve being formed of semi-rigid material and having a surface, top and bottom edges, first and second ends, and an interior cavity;
said interior cavity being open at said first and second ends of said outer sleeve;
said outer sleeve having a representation of a portion of a piano keyboard on and first and second sets of openings penetrating said surface;
a slide member, said slide member having a surface, first and second ends, and being sized and shaped to fit slidably within said interior cavity;
said surface of said slide member having a first portion and a second portion;
said first portion carrying alphabetic representations, said representations being sized and shaped to be visible through said first set of openings in said outer sleeve as said slide member is moved through said outer sleeve;
said alphabetic representations illustrating a selected musical key, a major scale, a major chord and a minor chord associated with said musical key;
said second portion having a first series of markings, said first markings being sized and shaped to be visible through said second set of openings in said outer sleeve as said slide member is moved through said outer sleeve;
said first markings indicating piano keys associated with the major scale associated with said selected musical key; and
whereby, when a user moves the slide member within said inner cavity of said outer sleeve, aligning one of the first set of openings in the outer sleeve with one of the alphabetic representations illustrating a selected musical key, the alphabetic representations for each note of the major scale as well as major and minor chords associated with that selected musical key will be visible through the first set of openings and the first markings indicating the piano keys associated with the major scale will be visible through the second set of openings.

2. A piano key finder and chord indicator as described in claim 1, further comprising means for preventing the slide member from being removed from the outer sleeve.

3. A piano key finder and chord indicator as described in claim 2, wherein the means for preventing the slide member from being removed from the outer sleeve further comprises:

first and second enlarged end sections, said enlarged end sections being attached at said first and second ends of said slide member;

said enlarged end sections being sized and shaped to prevent their passage through said interior cavity; and whereby, when the slide member is moved through the interior cavity to permit alignment of the alphabetic representations with the first set of openings, the slide member will remain permanently and slidably attached to the outer sleeve.

4. A piano key finder and chord indicator as described in claim 1, wherein the first series of markings are of a first predetermined color.

5. A piano key finder and chord indicator as described in claim 4, further comprising:

a sixth set of openings through said surface of said outer sleeve, said sixth set of openings being disposed upon said representation of a portion of a piano keyboard; and a fifth series of markings, said fifth series of markings being of a third predetermined color and disposed upon said second portion of said surface of said slide member and positioned so as to indicate the piano keys associated with a minor chord for a selected key when the slide member is aligned with the outer sleeve so that said alphabetic representation associated with the selected key is visible through one of the first set of openings.

6. A piano key finder and chord indicator as described in claim 4, further comprising:

a fifth set of openings through said surface of said outer sleeve, said fifth set of openings being disposed upon said representation of a portion of a piano keyboard; and a fourth set of markings, said fourth set of markings being of a second predetermined color and being disposed upon said second portion of said surface of said slide member and positioned so as to indicate the piano keys associated with a major chord for a selected key when the slide member is aligned with the outer sleeve so that said alphabetic representation associated with the selected key is visible through one of the first set of openings.

7. A piano key finder and chord indicator as described in claim 6, further comprising:

a fifth and sixth set of openings through said surface of said outer sleeve, said fifth and sixth set of openings being disposed upon said representation of a portion of a piano keyboard; and a fourth and fifth series of markings, said fourth and fifth series of markings being of second and third predetermined colors respectively, and disposed upon said second portion of said surface of said slide member and positioned so as to indicate the piano keys associated with a minor chord for a selected key when the slide member is aligned with the outer sleeve so that said alphabetic representation associated with the selected key is visible through one of the first set of openings.

8. A piano key finder and chord indicator as described in claim 1, in which said outer sleeve further has:

a finger notch, said finger notch being disposed at one end of said outer sleeve;

whereby, when one end of the slide member is aligned with the end of the outer sleeve having the notch, the finger notch will permit the slide member to be either pulled from and pushed into the outer sleeve.

9. A piano key finder and chord indicator as described in claim 1, wherein the second set of openings in the outer sleeve are of a first predetermined shape.

10. A piano key finder and chord indicator as described in claim 9, further comprising:

a third set of openings through said surface of said outer sleeve, said third set of openings being of a second predetermined shape and disposed upon said representation of a portion of a piano keyboard; and a second series of markings, said second series of markings being disposed upon said second portion of said surface of said slide member and positioned so as to indicate the piano keys associated with a major chord for a selected key when the sleeve member is aligned with the outer sleeve so that said alphabetic representation associated with the selected key is visible through one of the first set of openings.

11. A piano key finder and chord indicator as described in claim 10, further comprising:

a fourth set of openings through said surface of said outer sleeve, said fourth set of openings being of a third predetermined shape and disposed upon said representation of a portion of a piano keyboard; and a third series of markings, said third series of markings being disposed upon said second portion of surface of said slide member and positioned so as to indicate the piano keys associated with a minor chord for a selected key when the slide member is aligned with the outer sleeve so that said alphabetic representation associated with the selected key is visible through one of the first set of openings.

12. A piano key finder and chord indicator as described in claim 9, further comprising:

a fourth set of openings through said surface of said outer sleeve, said fourth set of openings being of a third predetermined shape and disposed upon said representation of a portion of a piano keyboard; and a third series of markings, said third series of markings being disposed upon said second portion of said surface of said slide member and positioned so as to indicate the piano keys associated with a minor chord for a selected key when the slide member is aligned with the outer sleeve so that said alphabetic representation associated with the selected key is visible through one of the first set of openings.

13. A method of displaying an alphabetic representation of a major scale, major and minor chords and identifying piano keys associated with a selected musical key, comprising steps of:

fabricating an outer sleeve of semi-rigid material, having a surface, top and bottom edges, first and second ends and an interior cavity; said interior cavity being open at said first and second ends of said outer sleeve;

applying a representation of a portion of a piano keyboard to said surface;

cutting a first and second series of openings through said surface;

fabricating a slide member having a surface, first and second ends and being sized and shaped to fit slidably within said interior cavity; said surface of said slide member having a first portion and a second portion;

marking said first portion with alphabetic representations, said representations being sized and shaped to be visible through said first set of openings in said outer sleeve as said slide member is moved through said outer sleeve; said alphabetic representations illustrating a selected musical key, a major scale, a major chord and a minor chord associated with said musical key;

applying a first series of markings to said second portion, said first series of markings being sized and shaped to be visible through said second set of openings in said outer sleeve as said slide member is moved through said outer sleeve; said first series of markings indicating piano keys associated with the major scale associated with said selected musical key; and moving said slide member within said inner cavity of said outer sleeve to align one of the first series of openings in the outer sleeve with one of the alphabetic representations illustrating a selected musical key;

whereby the alphabetic representations for each note of the major scale as well as major and minor chords associated with that selected musical key are displayed through the first series of openings, the first markings indicating the piano keys associated with the major scale are visible through the second set of openings.

14. A method of displaying an alphabetic representation of a major scale, major and minor chords and identifying piano keys associated with a selected musical key as described in claim 13, in which the step of cutting said second series of openings additionally comprising cutting said second set of openings with a first predetermined shape.

15. A method of displaying an alphabetic representation of a major scale, major and minor chords and identifying piano keys associated with a selected musical key as described in claim 14, further comprising the steps of:

cutting a fourth set of openings of a third predetermined shape through said representation of a portion of a piano keyboard on said outer sleeve;

applying a third set of markings to said second portion of said slide member, positioned so as to indicate the piano keys associated with a minor chord for a selected key; and aligning said slide member with the outer sleeve so that said alphabetic representation associated with the selected key is visible through one of the first set of openings;

whereby the piano keys associated with the minor chord associated with the selected musical key are displayed.

16. A method of displaying an alphabetic representation of a major scale, major and minor chords and identifying piano keys associated with a selected musical key as described in claim 14, further comprising the steps of:

cutting a third set of openings of a second predetermined shape through said representation of a portion of a piano keyboard on said surface of said outer sleeve;

applying a second set of markings to said second portion of said slide member, positioned so as to indicate the piano keys associated with a major chord for a selected key; and aligning said slide member with said outer sleeve so that said alphabetic representation associated with the selected key is visible through one of the first set of openings;

whereby the piano keys associated with the major chord associated with the selected musical key are displayed.

17. A method of displaying an alphabetic representation of a major scale, major and minor chords and identifying piano keys associated with a selected musical key as described in claim 16, further comprising the steps of:

cutting a fourth set of openings of third predetermined shape through said representation of a portion of a piano keyboard on said outer sleeve;

applying a third set of markings to said second portion of said slide member, positioned so as to indicate the piano keys associated with a minor chord for a selected key;

aligning said slide member with the outer sleeve so that said alphabetic representation associated with the selected key is visible through one of the first set of openings;

whereby the piano keys associated with the minor chord associated with the selected musical key are displayed.

18. A method of displaying an alphabetic representation of a major scale, major and minor chords and identifying piano keys associated with a selected musical key as described in claim 17, further comprising the steps of:

providing a fourth set of openings through said representation of a portion of a piano keyboard on said outer sleeve;

applying a third set of markings of a third predetermined color on said second portion of said slide member, positioned so as to indicate the piano keys associated with a minor chord for a selected key;

aligning said sleeve member with the outer sleeve so that said alphabetic representation associated with the selected key is visible through one of the first set of openings;

whereby the piano keys associated with the minor chord associated with the selected musical key are displayed.

19. A method of displaying an alphabetic representation of a major scale, major and minor chords and identifying piano keys associated with a selected musical key as described in claim 13, in which the step of applying the first set of markings additionally comprises providing the first set of markings in a first predetermined color.

20. A method of displaying an alphabetic representation of a major scale, major and minor chords and identifying piano keys associated with a selected musical key as described in claim 19, further comprising the steps of:

cutting a third set of openings through said representation of a portion of a piano keyboard on said outer sleeve; and applying a second set of markings of a second predetermined color, to said second portion of said slide member, positioned so as to indicate the piano keys associated with a major chord for a selected key;

aligning said sleeve member with the outer sleeve so that said alphabetic representation associated with the selected key is visible through one of the first set of openings;

whereby the piano keys associated with the major chord associated with the selected musical key are displayed.

21. A method of displaying an alphabetic representation of a major scale, major and minor chords and identifying piano keys associated with a selected musical key as described in claim 19, further comprising the steps of:

cutting a fourth set of openings through said representation of a portion of a piano keyboard on said outer sleeve;

applying a third set of markings of a third predetermined color on said second portion of said slide member, positioned so as to indicate the piano keys associated with a minor chord for a selected key;

aligning said sleeve member with the outer sleeve so that said alphabetic representation associated with the selected key is visible through one of the first set of openings;

whereby the piano keys associated with the minor chord associated with the selected musical key are displayed.

* * * * *